Oct. 10, 1933.   W. A. SPEAR   1,930,288
SYNCHRONOUS MOTOR CLOCK
Filed Nov. 17, 1930
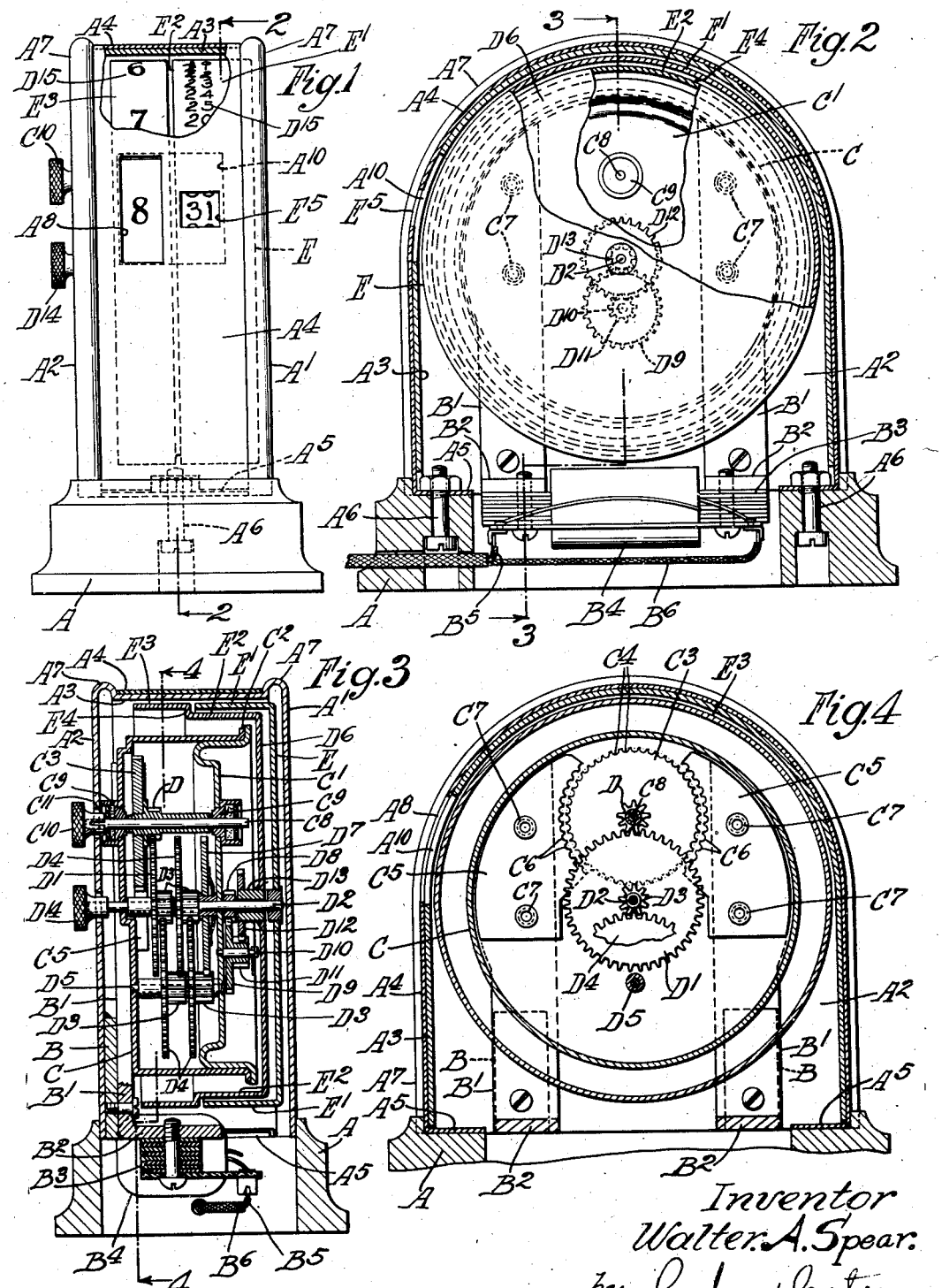
Inventor
Walter A. Spear.
by Parker Carter
Attorneys Patented Oct. 10, 1933                                                                       1,930,288

UNITED STATES PATENT OFFICE 1,930,288

SYNCHRONOUS MOTOR CLOCK

Walter A. Spear, Cincinnati, Ohio, assignor, by mesne assignments, to Victor Electric Products, Inc., Cincinnati, Ohio, a corporation of Ohio Application November 17, 1930
Serial No. 496,062

3 Claims. (Cl. 58—26)

My invention relates to a synchronous motor or alternating current clock, and has for one object the provision of a clock which may be operated by a synchronous motor in circuit with a commercial source or supply of alternating current. One object of my invention is the provision of such a clock which shall be sightly and compact, which shall take up a small space, for example upon a desk. Another object is the provision of such a clock in which a narrow case or housing may be employed. Another object is the provision of improved time indicating means. Another object is the provision of an improved multiple drum for the time indicating device. Other objects will appear from time to time in the course of the specification and claims.

I illustrate my invention more or less diagrammatically in the accompanying drawing, wherein—

Figure 1 is a front elevation with parts broken away;

Figure 2 is a section on the line 2—2 of Figure 1;

Figure 3 is a section on the line 3—3 of Figure 2; and

Figure 4 is a section on the line 4—4 of Figure 3.

Like parts are indicated by like symbols throughout the specification and drawing.

Referring to the drawing, A generally indicates a clock base on which may be mounted a housing structure which includes side panels $A^1$ $A^2$, connected by an arcuate intermediate wall $A^3$. Overlying said wall is a front and rear panel or strip $A^4$ having inturned ends $A^5$ which may be secured to the base as by the bolts $A^6$. It will be understood that the surrounding strip $A^4$ clamps the housing structure which includes the panels $A^1$ $A^2$ and arcuate wall $A^3$ upon the base A. I illustrate the edges of the panels $A^1$ $A^2$ as rolled over as at $A^7$ which project beyond the edges of the strip $A^4$. $A^8$ is an indicating aperture in one side of the panel $A^1$. An aperture $A^{10}$ in the wall $A^3$ is in register with the aperture $A^8$.

Positioned on the inner face of the panel $A^2$ are a plurality of relatively thick plates B, to which may be secured combined pole pieces and clock supports $B^1$, the pole pieces being provided with angles or outwardly projecting offsets $B^2$ at their lower ends, connected by the laminated member $B^3$, about which is the coil $B^4$ in circuit as by conductive lines $B^5$ $B^6$ with any suitable source of alternating current.

Secured to the upper ends of the pole pieces $B^1$ is an oil-tight housing, including the housing or cup member C and a lid or front $C^1$ therefor, the edges of the members C and $C^1$ being secured together, for example soldered, as at $C^2$. Positioned within the housing C is the rotor proper $C^3$ of the synchronous motor clock. This rotor being indicated as having a plurality of teeth $C^4$ opposed to the teeth $C^6$ on the pole pieces $C^5$ secured to and in effect forming part of the pole pieces $B^1$. The inner pole pieces $C^5$ are positioned inside of the housing C, which are connected to the exterior pole pieces, for example by bolts or rivets $C^7$. The relation of the inner pole pieces $C^5$ and the rotor $C^3$ will be clear from Figure 4. The rotor $C^3$ is mounted on a shaft $C^8$ rotating in suitable bearings $C^9$ and terminating, exteriorly of the housing C, in a knurled knob $C^{10}$. This knob is positioned exteriorly of the panel $A^2$, the panel being apertured as at $C^{11}$ to permit its passage therethrough.

D is a pinion on the rod $C^8$ in mesh with a gear $D^1$ on the shaft $D^2$. The details of the clock mechanism or train of gears herein shown do not of themselves form part of the present invention, but it will be understood that through the train of gears, including the pinion D, the gear $D^1$ and other pinions $D^3$ and gears $D^4$ on the shafts $D^2$ and $D^5$ respectively, rotation of the rotor $C^3$ and the shaft $C^8$ effects rotation of the drum $D^6$. The gears $D^4$ and associated pinions $D^3$ are loosely mounted upon the shafts $D^2$ $D^5$. In mesh with one of the pinons $D^3$ upon the shaft $D^5$ is the gear $D^7$ fixed in relation with the shaft $D^2$. Mounted for rotation with the shaft $D^2$ exterior of the housing C is the driving pinion $D^8$ in mesh with the gear $D^9$ upon the stub shaft $D^{10}$. The final driving connection is through the associated pinion $D^{11}$ meshing with the gear $D^{12}$ fixed in relation to the sleeve $D^{13}$ which serves to support and center the drum $D^6$ and fix its axis of rotation. The sleeve $D^{13}$ is mounted upon and free to rotate independently of rotation of the shaft $D^2$. The above described drum $D^6$ is equivalent to the hour hand of the ordinary clock. To provide a more rapidly rotating drum which shall be the equivalent of a minute hand, I provide the additional drum E which is mounted directly upon the shaft $D^2$ and rotates with it in contrast to the loose mounting of the drum $D^6$ about the shaft $D^2$. In order to provide two parallel drums of like radius, I provide for the drum E a cylindrical drum flange $E^1$ which lies within or about the reduced portion $E^2$ of the drum $D^6$. The drum $D^6$ is provided with a portion $E^3$ of like radius as the drum portion E¹, which is connected by the offset portion or shoulder E⁴ with the reduced drum portion E². An additional indicating aperture E⁵ is provided, adjacent the hour indicating aperture A⁸. It will be understood that the time indicating symbols D¹⁵ differ on the two drums, the hour symbol, for example, being positioned upon the drum portion E³, and the minute symbol on the drum portion E¹. I may, if desired, form the hour aperture A⁸ longer than the minute aperture, since the desired time of exposure of any individual hour symbol is greater than the time of exposure of any individual minute symbol. Or, if desired, the apertures may be made of the same length. The shaft D² is also provided with an exterior knob D¹⁴, whereby a more rapid rotation of the drums may be provided than is obtained through the normal rotation of the rotor C³. This permits the setting of the drums at any desired position, and thus permits setting of the time indicating means, when correction is necessary.

It will be realized that whereas I have described and shown a practical and operative device, nevertheless many changes may be made in size, shape, number and distribution of parts. I therefore wish my drawing and description to be taken as in a broad sense illustrative and diagrammatic, rather than as limiting me to the precise features and limitations herein described and shown. In particular I wish it to be understood that the precise details of the synchronous motor herein shown do not of themselves form part of the present invention, and I do not wish my present invention to be limited to use with a synchronous motor clock or to use with the particular motor shown.

The use and operation of my invention are as follows:

The coil B⁴, being in circuit with commercially supplied alternating current, the alternation of the current through the pole pieces B¹ and C⁵ causes a rotation of the rotor C³ and the shaft C⁸ in step with the alternating current supply. This rotation of the rotor C³ and the shaft C⁸ causes a rotation of the drums E¹ E³. Rotation of the drums causes movement of the time indicating symbols D¹⁵ in line with the apertures A⁸ and E⁵. Assuming that one drum may be marked to indicate the passage of twelve hours and the other to mark the passage of sixty minutes, the device may be geared to cause one complete rotation of the drum E³ every twelve hours and a complete rotation of the drum E¹ every hour. However, with appropriate markings, the drums may be caused to complete their rotation with a shorter or a longer period, depending upon the lapse of time to be indicated. The alternating current motor may be launched, for example by manual rotation of the knob C¹⁰, and if launched at a speed approximately that or somewhat greater than synchronous, it will continue rotation indefinitely unless and until the circuit through the coil B⁴ is interrupted or broken. In order to set the drum, for example to compensate a stoppage of the clock, the operator rotates a knob D¹⁴ which effects a rather rapid rotation of the drum and permits it to be readily set.

One important advantage of my device is its compactness. The outer casing, including the panels A¹ and A² and the strip A⁴, conforms closely in form and in size to the drums E¹ E³, which rotate therewithin.

I claim:

1. In a clock, a base, a clock case mounted on said base having flat side walls, pole pieces carried by said base and extending upwardly within the case parallel with and adjacent to one of said side walls, a clock train and an oil-tight housing therefor carried by said pole pieces and projecting therefrom toward the other flat wall of the clock case, a driven shaft through said housing, a plurality of indicating drums on said shaft and means for rotating them at different speeds.

2. In a clock, a base, a clock case mounted on said base having flat side walls, pole pieces carried by said base and extending upwardly within the case adjacent to one of said side walls, a clock train and an oil-tight housing therefor carried by said pole pieces and projecting therefrom toward the other flat wall of the clock case, a driven shaft through said housing, a plurality of indicating drums on said shaft and means for rotating them at different speeds.

3. In a clock, a base, a clock case mounted on said base having flat side walls, pole pieces carried by said base and extending upwardly within the case parallel with and adjacent to one of said side walls, a clock train and an oil-tight housing therefor carried by said pole pieces and projecting therefrom toward the other flat wall of the clock case, a driven shaft through said housing, a plurality of indicating drums on said shaft between the flat walls of the case, and means for rotating them at different speeds.

WALTER A. SPEAR.